United States Patent
Uppiano et al.

(10) Patent No.: US 6,508,026 B1
(45) Date of Patent: Jan. 21, 2003

(54) RIFLE SCOPE WITH SIDE INDICIA

(75) Inventors: Eric Uppiano, Forest Grove, OR (US); Rich Spelhaug, Onalaska, WI (US)

(73) Assignee: Simmons Outdoor Corporation, Thomas, GA (US)

(*) Notice: Subject to any disclaimer, the term of this patent is extended or adjusted under 35 U.S.C. 154(b) by 0 days.

(21) Appl. No.: 09/704,933

(22) Filed: Nov. 2, 2000

Related U.S. Application Data
(60) Provisional application No. 60/163,108, filed on Nov. 2, 1999.

(51) Int. Cl.[7] ................................................. F41G 1/38
(52) U.S. Cl. .............................. 42/119; 42/111; 42/122; 42/125; 42/140
(58) Field of Search ........................... 42/111, 119, 101, 42/120, 122, 140, 125, 123, 124; D22/108, 109; D16/132

(56) References Cited

U.S. PATENT DOCUMENTS

| | | | |
|---|---|---|---|
| 2,189,964 A | | 2/1940 | Sealey |
| 2,424,011 A | * | 7/1947 | Gramont |
| 2,482,822 A | | 9/1949 | Zaroodny |
| 2,927,375 A | | 3/1960 | Luebkeman |
| 3,336,831 A | * | 8/1967 | Unertl, Jr. |
| 3,386,171 A | | 6/1968 | Luebkeman |
| 3,782,822 A | * | 1/1974 | Spence |
| 3,904,279 A | * | 9/1975 | Sanada |
| 3,938,875 A | | 2/1976 | Ruder |
| 4,561,204 A | | 12/1985 | Binion |
| D287,136 S | * | 12/1986 | Murray, Jr. ................. D16/132 |
| 4,777,730 A | | 10/1988 | Huggins |
| 4,822,994 A | | 4/1989 | Johnson et al. |
| 4,841,659 A | | 6/1989 | Williams |
| 4,993,158 A | | 2/1991 | Santiago |
| 5,181,323 A | | 1/1993 | Cooper |
| 5,276,554 A | * | 1/1994 | Nassivera ..................... 42/101 |
| D346,392 S | | 4/1994 | Tomita |
| 5,406,733 A | * | 4/1995 | Tarlton et al. ................. 42/101 |
| 5,764,410 A | * | 6/1998 | Jibiki |
| 5,920,995 A | * | 7/1999 | Sammut |
| D413,153 S | * | 8/1999 | Tucker ....................... D22/109 |
| D417,679 S | * | 12/1999 | Cross et al. ............... D22/109 |
| D427,658 S | * | 7/2000 | Tucker ....................... D22/109 |
| 6,131,294 A | * | 10/2000 | Jibiki ........................... 42/101 |
| 6,295,754 B1 | * | 10/2001 | Otteman et al. .............. 42/124 |

* cited by examiner

Primary Examiner—Michael J. Carone
Assistant Examiner—Lulit Semunegus
(74) Attorney, Agent, or Firm—Brinks Hofer Gilson & Lione

(57) ABSTRACT

A rifle scope having a power adjustment bezel and a distance adjustment bezel, both bezels being rotatable to alter the power and distance of the scope, respectively. Both bezels comprise a rearwardly facing indicia ring that is visible from the rearward end of the scope so as to permit a reading of the scope power and distance settings without removing the scope from the aiming or shooting position.

13 Claims, 3 Drawing Sheets

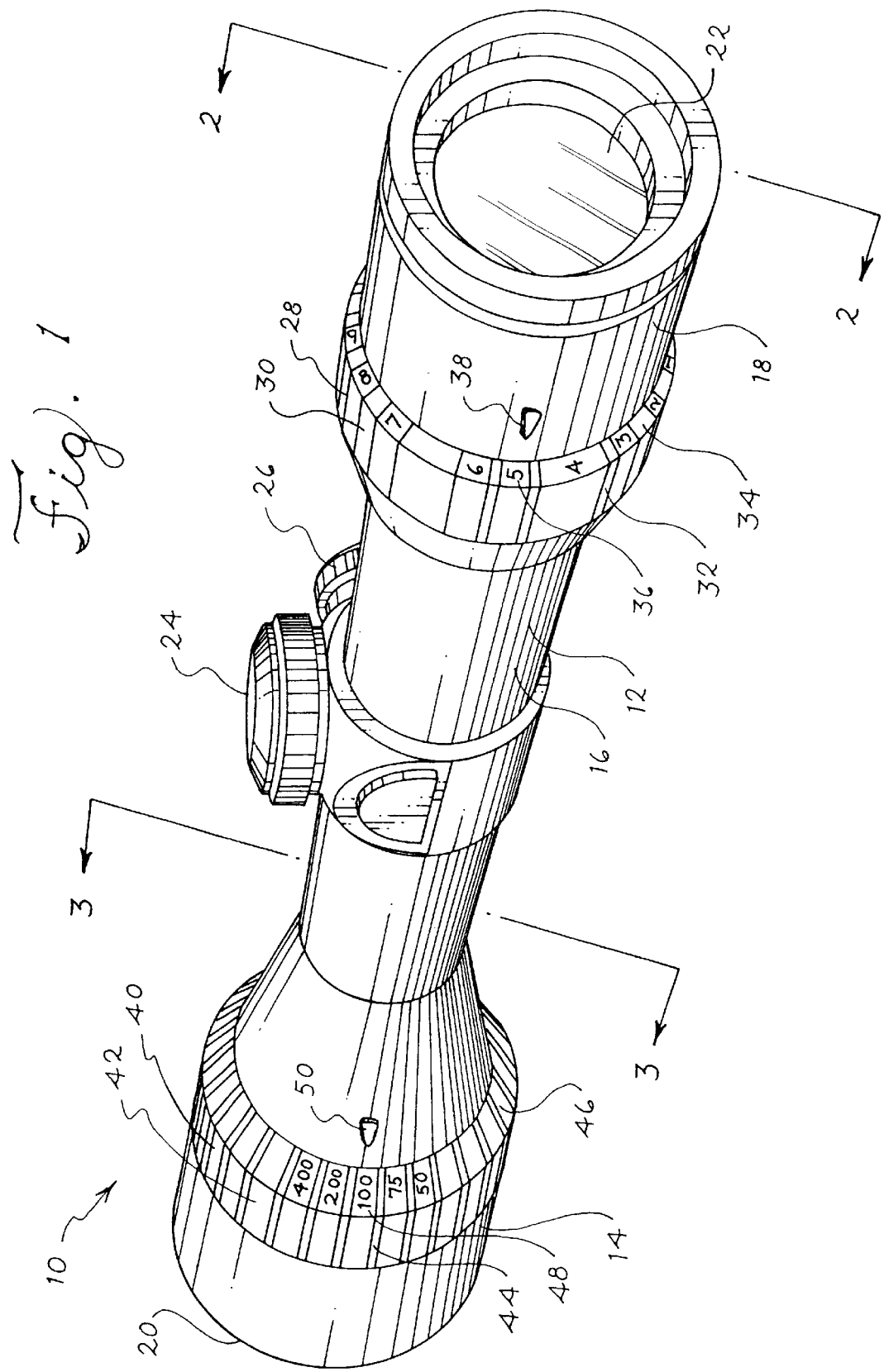

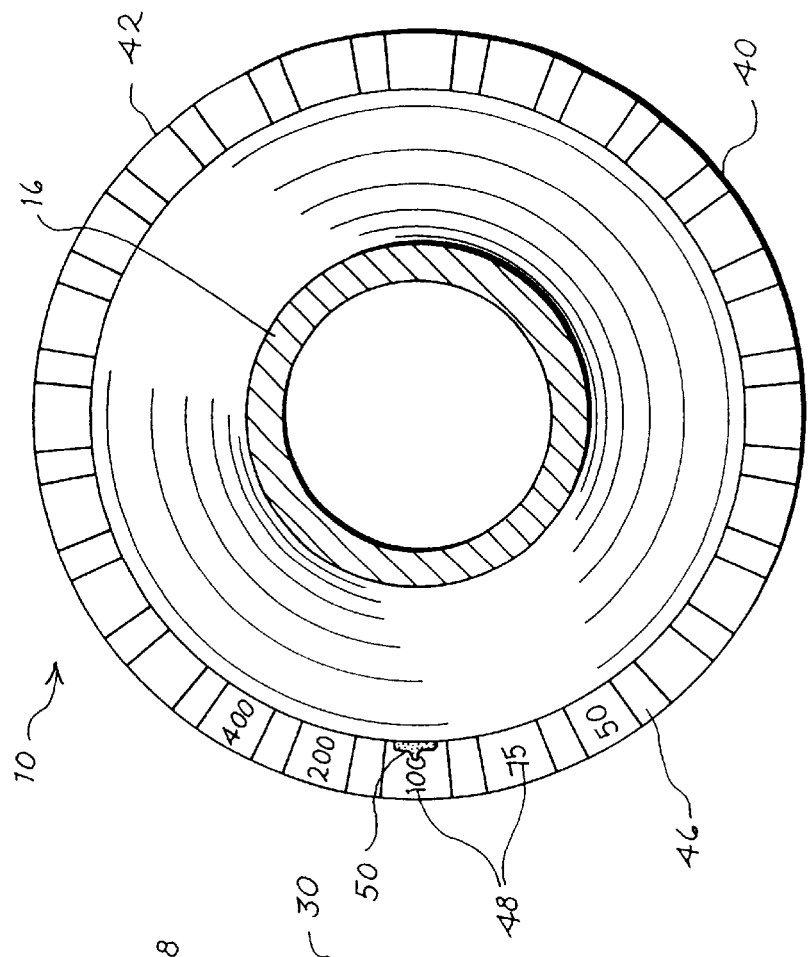
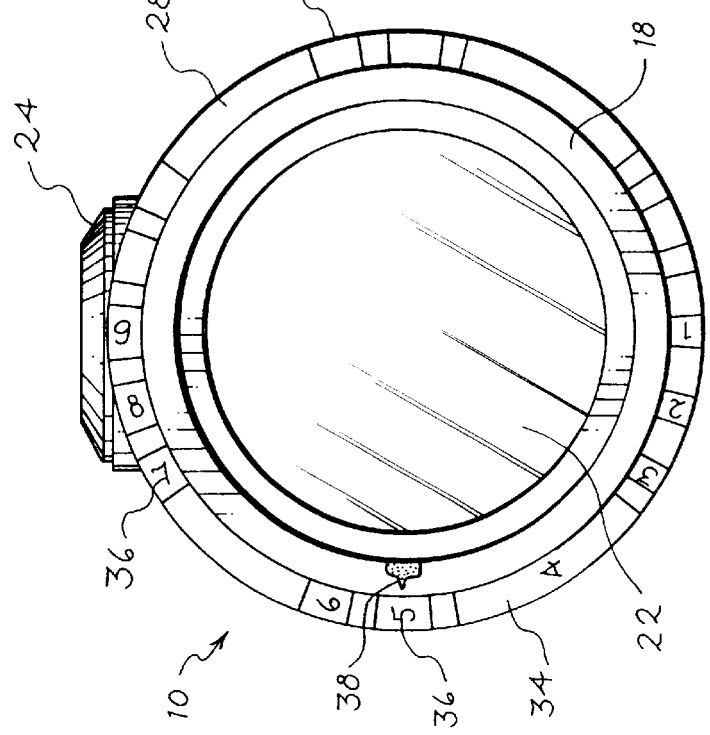

RIFLE SCOPE WITH SIDE INDICIA

RELATED APPLICATION

This application claims the benefit of U.S. Provisional Patent Application Serial No. 60/163,108, entitled Rifle Scope With Side Indicia, filed Nov. 2, 1999.

FIELD OF THE INVENTION

The invention generally relates to the field of telescopic sights, and more particularly, to an improved scope for use with a rifle.

BACKGROUND OF THE INVENTION

Telescopic scopes are commonly used on rifles to assist in sighting and aiming the rifle at a visible target. In general, telescopic rifle scopes include a series of lenses or optics that magnify or enhance the appearance of the target. Telescopic rifle scopes also include a sighting device, such as cross-hairs, that enable accurate positioning of the scope on the target.

Typical rifle scopes include adjustments for both the distance and scope power. The adjustment for the scope power alters the arrangement of the lenses so as to alter the amount of magnification desired. The adjustment for the distance alters the focal point of the scope's optics so as to focus the image of the target. Once the image of the target has been properly focussed, then the distance to the target can be determined by reference to the scope adjustment settings.

The distance and power adjustments usually include indicia that are visible only on the top of the scope. This requires the user to take the rifle out of the use or aiming position and look at the top of the scope to determine if the settings are correct for the particular circumstances. For example, a hunter may need to look at the settings on the scope to determine if the position of the scope cross-hairs relative to the rifle needs to be adjusted to accommodate for the effects of gravity or wind on the trajectory of the bullet. After any adjustments are made, the rifle must then be repositioned in the aiming position and the target must be reacquired. This may be difficult, particularly if the target is a live animal and/or moving.

Accordingly, it would be desirable to have a telescopic rifle scope that overcomes the disadvantages and limitations described above.

SUMMARY OF THE INVENTION

In view of the above, the present invention provides a unique telescopic rifle scope that overcomes the disadvantages and limitations described above. In particular, the rifle scope of the present invention includes indicia for the power and distance settings on the side of the scope that are visible with the non-aiming eye. This allows the user to view the scope power and distance settings without removing the scope from the aiming position. The user can therefore maintain his or her aim on the target, or at the very least, greatly reduce the movement needed to see the power and distance settings.

In the preferred embodiment of the invention, the indicia with respect to the distance settings are located on a bezel near the forward end of the scope. The indicia with respect to the power settings are located on a bezel located near the rearward end of the scope. Rotation of these bezels alters the distance (i.e., focal point) and power (i.e., magnification) of the scope. A marker, such as a raised arrow, is located on the side of the scope housing adjacent to and rearward from each bezel and provides a reference point for determining the scope settings. The power and distance settings are determined by comparing the position of the indicia on the bezels relative to the markers.

The indicia are located on the aft face of each of the adjustment bezels so as to be visible from the rearward end of the scope. In particular, the bezels are configured so that the non-aiming eye can view the indicia while the scope is in the aimed position. For example, if the user sights through the scope with his or her right eye (the aiming eye), then the indicia and the markers will be visible with the left eye (non-aiming eye). In the preferred embodiment, the aft face of each bezel is angled so that the indicia are also visible from the side of the scope.

The preferred embodiment of the invention includes features in addition to those listed above. Moreover, the advantages over the current art discussed above are directly applicable to the preferred embodiment, but are not exclusive. The other features and advantages of the present invention will be further understood and appreciated when considered in relation to the detailed description of the preferred embodiment.

BRIEF DESCRIPTION OF THE DRAWINGS

FIG. 1 is a perspective view of a telescopic rifle scope of the present invention;

FIG. 2 is a sectional view taken along line 2—2 of FIG. 1 showing the scope power adjustment bezel;

FIG. 3 is a sectional view taken along line 3—3 of FIG. 1 showing the scope distance adjustment bezel.

DETAILED DESCRIPTION OF THE PRESENTLY PREFERRED EMBODIMENTS

Figure 4:
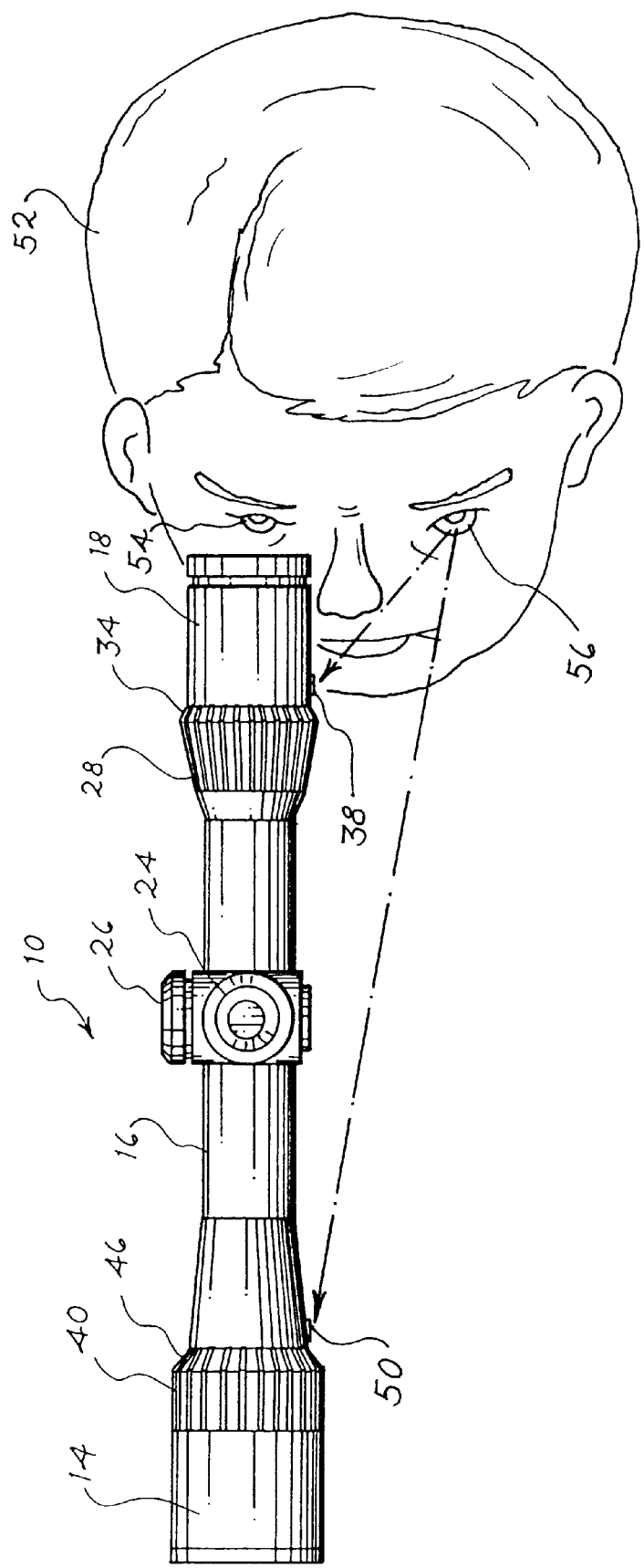
FIG. 4 is a schematic top view of a user utilizing the scope of the present invention.

Referring now to the drawings, FIGS. 1–3 show the preferred embodiment of the rifle scope 10 of the present invention. The rifle scope includes a plurality of lenses enclosed in a housing 12. The housing 12 includes a forward tube 14, an intermediate tube 16, and a rearward tube 18. In the preferred embodiment shown, the forward tube 14 has diameter of approximately 2 inches, the intermediate tube 16 has a diameter of approximately 1 inch, and the rearward tube 18 has a diameter of approximately 1.5 inches.

The forward tube 14 encloses the objective lens 20. The objective lens 20 is directed towards the object to be sited. The rearward tube 18 encloses the ocular lens or eyepiece 22. The user (see FIG. 4) places his eye against the ocular lens 22 to sight through the scope 10. The housing 12 may also enclose additional lenses located between the objective lens 20 and the ocular lens 22. Rays coming from a distant object pass through the objective lens 20 and the ocular lens 22 to form a magnified image of the object. The design, arrangement and manufacture of lenses for use in telescopic sighting devices are well known to those skilled in the art.

The scope 10 includes mounting hardware (not shown) that connects the scope 10 to the rifle (not shown). The mounting hardware may include an adjustment mechanism that allows the orientation of the scope 10 to be adjusted relative to the rifle. This adjustment mechanism (not shown) can be used to "zero" or correct the orientation of the scope relative to the rifle.

The scope 10 includes a windage adjustment knob 26 located on the side of the intermediate tube 16. Rotation of the windage adjustment knob 26 causes the internal components of the scope 10 to rotate in a horizontal plane relative to the rifle. This permits the cross-hairs of the scope 10 to be adjusted so as to accommodate for the effects of wind on the trajectory of the rifle bullet. For example, if the user perceives a wind blowing across the intended path of the bullet, then the internal components of the scope 10 can be adjusted to offset cross-hairs away from the direction of the wind, thereby causing the rifle to point towards the direction from which the wind is blowing (i.e., towards the windward side of the target) when the target is cited. If adjusted properly, the actual path of the bullet (as pushed by the wind) will coincide with the target.

The scope 10 also includes an elevation adjustment knob 24 located on the top of the intermediate tube 16. As will be explained below, the elevation adjustment knob 24 of the preferred embodiment is located on the right-hand side of the scope 10 so as not to interfere with the user's line of sight to other components. Rotation of the elevation adjustment knob 24 causes the internal components of the scope 10 to rotate in a vertical plane relative to the rifle. This permits the cross-hairs of the scope 10 to be adjusted so as to accommodate for the effects of gravity on the trajectory of the bullet. For example, depending on the distance to the intended target, the scope 10 can be adjusted so as to lower the cross-hairs relative to the rifle, thereby causing the end of the rifle to point above the target when the target is cited. If adjusted properly, the arc of the bullet path will coincide with the target. The design and operation of the windage and elevation adjustment mechanisms are well known to those skilled in the art.

The power of the scope 10 is adjusted by rotation of the power adjustment bezel 28 located on the rearward tube 18. Rotation of the power adjustment bezel 28 alters the arrangement or configuration of the lenses so as to change the magnification of the image that is being viewed through the scope 10. The power adjustment bezel 28 comprises a tubular construction having an exterior grab surface 30. In the preferred embodiment shown, the exterior grab surface 30 includes ridges 32 to facilitate the manipulation of the power adjustment bezel 28 by the user. The power adjustment bezel 28 also comprises an angled indicia ring 34 located along the rearward edge of the exterior grab surface 30 and generally facing rearwardly. The face of the indicia ring 34 includes numbers 36 corresponding to the power settings of the scope 10. A marker or arrow 38 is located on the side of the rearward tube 18 adjacent to the indicia ring 34. The degree of magnification (i.e., power) of the scope is determined by the position of the power adjustment bezel 28 relative to the marker 38. In other words, the number 36 on the face of the indicia ring 34 that is adjacent to the marker 38. Although not shown, the design of the mechanical apparatus which connects the power adjustment bezel 28 to the lenses and permits the power of the scope 10 to be altered is well known to those skilled in the art.

As best seen in FIGS. 1 and 2, the face of the indicia ring 34 is angled outwardly and towards the rear of the scope 10 so as to visible form both the side and the rear of the scope 10. For example, and as best seen in FIG. 4, as a user 52 sights through the scope 10 with the right eye (the aiming eye) 54 the numbers 36 on the face of the indicia ring 34 (i.e., the power settings) relative to the marker 38 can still be observed with the left eye (the non-aiming eye) 56. Thus, the user 52 can readily determine the current power setting for the scope 10 without leaving aiming/shooting position. In the preferred embodiment shown, the angle of the face of the indicia ring 34 is approximately 45 degrees relative to the centerline of the scope 10. In addition, the marker 38 preferably projects outwardly from the surface of the rearward tube 18 so as to be visible from the rear of the scope 10.

The distance or focus of the scope 10 is adjusted by rotation of the distance adjustment bezel 40 located on the forward tube 14. Rotation of the distance adjustment bezel 40 alters the arrangement or configuration of the lenses so as to change the focal point relative to the image that is being viewed through the scope 10. The distant adjustment bezel 40 comprises a tubular construction having an exterior grab surface 42. In the preferred embodiment shown, the exterior grab surface 42 includes ridges 44 to facilitate the manipulation of the distant adjustment bezel 40 by the user. The distant adjustment bezel 40 also comprises an angled indicia ring 46 located along the rearward edge of the exterior grab surface 42 and generally facing rearwardly. The face of the indicia ring 46 includes numbers 48 corresponding to the distance settings of the scope 10. A marker or arrow 50 is located on the side of the forward tube 14 adjacent to the indicia ring 46. The distance to the object being viewed through the scope 10 is determined by the position of the distance adjustment bezel 40 relative to the marker 50. In other words, the number 48 on the face of the indicia ring 46 that is adjacent to the marker 50. Although not shown, the design of the mechanical apparatus which connects the distance adjustment bezel 40 to the lenses and permits the focal point of the scope 10 to be altered is well known to those skilled in the art.

As best seen in FIGS. 1 and 3, the face of the indicia ring 46 is angled outwardly and towards the rear of the scope 10 so as to visible form both the side and the rear of the scope 10. For example, and as best seen in FIG. 4, as a user 52 sights through the scope 10 with the right eye (the aiming eye) 54 the numbers 48 on the face of the indicia ring 46 (i.e., the distance settings) relative to the marker 50 can still be observed with the left eye (the non-aiming eye) 56. Thus, the user 52 can readily determine the current distance setting for the scope 10 without leaving the aiming or shooting position. In the preferred embodiment shown, the angle of the face of the indicia ring 46 is approximately 45 degrees relative to the centerline of the scope 10. In addition, the marker 50 preferably projects outwardly from the surface of the forward tube 14 so as to be visible from the rear of the scope 10.

In the preferred embodiment, and as best seen in FIG. 4, the diameter of the distance adjustment bezel 40 is larger than the diameter of the power adjustment bezel 28. This further improves the visibility of the distance adjustment bezel 40 by creating a visual separation between the two bezels 28, 40. This allows the shooter to view the distance adjustment bezel 40 without moving from the shooting position.

The scope 10 of the preferred embodiment is configured to be utilized by a user that aims or sights through the scope with the right eye. Thus, the components relating to the power adjustment bezel 28 and the distance adjustment bezel 40 are located on the left side of the scope so as to be visible from the user's left eye. Likewise, the windage adjustment knob 26 is located on the right side of the scope 10 so as to not interfere with the visibility of the power adjustment bezel 28 and the distance adjustment bezel 40. Of course, the location of these components can be reversed so as to accommodate a user that aims or sights through the scope 10 with the left eye.

In addition, many of the components can be painted with high visibility paints to further improve the visibility of the various scope settings. For example, the numbers 36, 48 and the markers 38, 50 are typically colored with high visibility yellow paint to enhance their visibility.

It should be appreciated that the present invention may be performed or configured as appropriate for the application. The embodiments described above are to be considered in all respects only as illustrative and not restrictive. The scope of the invention is indicated by the claims rather than by the foregoing description. All changes, which come within the meaning and range of equivalency of the claims, are to be embraced within their scope.

We claim:

1. A rifle scope comprising:
    a housing enclosing a plurality of lenses for the magnification of an image viewed through the scope, said housing having a forward end and a rearward end;
    a distance adjustment bezel comprising an exterior grab surface and a rearwardly facing indicia ring, said indicia ring having a face that is disposed at an angle relative to a centerline of the scope so as to be observable from the rearward end of the scope;
    a power adjustment bezel comprising an exterior grab surface and a rearwardly facing indicia ring, said indicia ring having a face that is disposed at an angle relative to the centerline of the scope so as to be observable from the rearward end of the scope; and
    a first marker that is located on a side of the housing adjacent to said distance adjustment bezel indicia and a second marker that is located on the side of the housing adjacent to the power adjustment bezel indicia ring, said first marker and said second marker both projecting outwardly from the side of the housing so as to be visible from the rearward end of the scope.

2. The rifle scope of claim 1 wherein the rearwardly facing indicia ring of the distance adjustment bezel and the rearwardly facing indicia ring of the power adjustment bezel each comprise markings that are visible from a shooter's non-aiming eye while said shooter's aiming eye is sighting through said scope.

3. The rifle scope of claim 2 wherein said markings are yellow in color.

4. The rifle scope of claim 1 wherein said rifle scope is mounted on a rifle.

5. The rifle scope of claim 1 wherein said first marker and said second marker are located on a left side of said rifle scope.

6. A method of using a rifle having a rifle scope mounted thereon, said rifle scope comprising a housing enclosing a plurality of lenses for the magnification of an image viewed through the rifle scope, said housing having a forward end and a rearward end, a distance adjustment bezel comprising an exterior grab surface and a rearwardly facing indicia ring, said distance adjustment bezel indicia ring having a face that is disposed at an angle relative to a centerline of the scope so as to be observable from the rearward end of the rifle scope, and a power adjustment bezel comprising an exterior grab surface and a rearwardly facing indicia ring, said power adjustment bezel indicia ring having a face that is disposed at an angle relative to a centerline of the scope so as to be observable from the rearward end of the rifle scope, wherein said method comprises the steps of:
    a) positioning said rifle in a shooting position;
    b) sighting through said rifle scope with an aiming eye;
    c) observing the face of the distance adjustment bezel indicia ring relative to a first marker projecting outwardly from a side of the housing, said face being observed with a non-aiming eye while maintaining said rifle in said shooting position; and
    d) observing the face of the power adjustment bezel indicia ring relative to a second marker projecting outwardly from the side of the housing, said face being observed with the non-aiming eye while maintaining said rifle in said shooting position.

7. The method of using a rifle having a rifle scope mounted thereon according to claim 6 wherein steps c) and d) are each carried out while simultaneously sighting through said rifle scope with said aiming eye.

8. The rifle scope of claim 1 wherein the face of the indicia ring of said distance adjustment bezel projects outwardly from a side portion of the housing that is adjacent to and rearward of said distance adjustment bezel, and wherein the face of the indicia ring of the power adjustment bezel projects outwardly from a side portion of the housing that is adjacent to and rearward of said power adjustment bezel.

9. A rifle scope comprising:
    a housing enclosing a plurality of lenses for the magnification of an image viewed through the scope, said housing having a forward end and a rearward end;
    a distance adjustment bezel comprising an exterior grab surface and an indicia ring, said indicia ring having a rearwardly facing surface that is disposed at an angle relative to a side of the housing so as to be visible from the rearward end of the scope;
    a first marker located adjacent to the distance adjustment bezel indicia ring and projecting outwardly from the side of the housing so as to be visible from the rearward end of the scope;
    a power adjustment bezel comprising an exterior grab surface and an indicia ring, said indicia ring having a rearwardly facing surface that is disposed at an angle relative to the side of the housing so as to be visible from the rearward end of the scope; and
    a second marker located adjacent to the power adjustment bezel indicia ring and projecting outwardly from the side of the housing so as to be visible from the rearward end of the scope.

10. The rifle scope of claim 9 wherein the rearwardly facing surface of the indicia ring of said distance adjustment bezel projects outwardly from a side portion of the housing that is adjacent to and rearward of said distance adjustment bezel, and wherein the rearwardly facing surface of the indicia ring of the power adjustment bezel projects outwardly from a side portion of the housing that is adjacent to and rearward of said power adjustment bezel.

11. The rifle scope of claim 9 wherein the rearwardly facing surface of the indicia ring of said distance adjustment bezel and the rearwardly facing surface of the indicia ring of said power adjustment bezel each comprise markings that are visible from a shooter's non-aiming eye while said shooter's aiming eye is simultaneously sighting through said scope.

12. The rifle scope of claim 11 wherein the indicia ring of said distance adjustment bezel and the indicia ring of said power adjustment bezel each comprise a outwardly facing surface generally disposed parallel to the side of the scope and adjacent to the rearwardly facing surface.

13. The rifle scope of claim 12 wherein the outwardly facing surface of the indicia ring of said distance adjustment bezel comprises markings that are similar to the markings on the rearwardly facing surface of the indicia ring of said distance adjustment bezel, and wherein the outwardly facing surface of the indicia ring of said power adjustment bezel comprises markings that are similar to the markings on the rearwardly facing surface of the indicia ring of said power adjustment bezel.

* * * * *